United States Patent
Nimmergut et al.

(10) Patent No.: US 6,250,910 B1
(45) Date of Patent: Jun. 26, 2001

(54) THERMOFORMING TOOL

(75) Inventors: Edgar Nimmergut, White Lake, MI (US); Jürgen Lause, Hasbergen (DE)

(73) Assignee: Fritsche Moellmann, GmbH & Co. KG, Lotte (DE)

( * ) Notice: Subject to any disclaimer, the term of this patent is extended or adjusted under 35 U.S.C. 154(b) by 0 days.

(21) Appl. No.: 09/178,726

(22) Filed: Oct. 26, 1998

(30) Foreign Application Priority Data

Oct. 24, 1997 (DE) .............................................. 197 46 857

(51) Int. Cl.$^7$ .................................................... B29C 53/00
(52) U.S. Cl. ........................ 425/504; 425/216; 425/388; 156/382; 156/468; 156/475; 156/494
(58) Field of Search ..................................... 425/388, 216, 425/504; 156/381, 382, 468, 475, 494, 581

(56) References Cited

U.S. PATENT DOCUMENTS

| | | | |
|---|---|---|---|
| 4,249,983 | * | 2/1981 | Fujii ...................................... 156/475 |
| 5,238,640 | * | 8/1993 | Masui et al. .......................... 264/266 |
| 5,711,845 | * | 1/1998 | Ozawa et al. ....................... 156/477.1 |
| 5,820,724 | * | 10/1998 | Diekwisch ............................ 156/382 |

* cited by examiner

*Primary Examiner*—Nam Nguyen
*Assistant Examiner*—Donald Heckenberg
(74) *Attorney, Agent, or Firm*—Milde, Hoffberg & Macklin, LLP

(57) ABSTRACT

A thermoforming tool employed for wrap-around lamination of a sheet to at least one edge (3) of a molding (2) loosely resting on the tool's lower half. The tool comprises a sheet-stretching frame (4) that is positioned over the molding and lowers a thermally plasticized sheet (5) tensioned therein at its edges into a holding position below the edge of the molding, a device for sealing the sheet off from the lower half of the tool, and a device for applying a suction in the subsequent lamination process. The suction device includes an evacuatable depression (9) in the lower half of the tool and below the edge of the molding. The object is to provide smoother lamination. The lower half (1) of the tool has a sealing lip (8) at the level of a conceptual plane below the edge of the molding. The lip parallels the edge of the molding and demarcates the depression. The sheet is applied against and stretched over the lip by a plunger (7) that descends between the lip and the sheet-stretching frame into a lowermost position. The face of the plunger parallels the top of the edge of the molding. Once it is in its lowermost position, the plunger is subject to a return stroke to a position approximately at the level of the conceptual plane of the edge of the molding.

13 Claims, 4 Drawing Sheets

THERMOFORMING TOOL

BACKGROUND OF THE INVENTION

The present invention concerns a thermoforming tool employed for wrap-around lamination of a sheet to at least one edge of a molding loosely resting on the tool's lower half. The tool comprises a sheet-stretching frame that is positioned over the molding and lowers a thermally plasticized sheet tensioned therein at its edges into a holding position below the edge of the molding, means of sealing the sheet off from the lower half of the tool, and means of suction employed in the subsequent lamination process. The means of suction consist of an evacuatable depression in the lower half of the tool and below the edge of the molding.

Thermoforming tools of this type are known. Once the motionless sheet has been statically formed to the surface of the molding, the upper half of the tool is lowered against its lower half, swaging the sheet in the vicinity of the depression. Vacuum generated in the depression wraps the sheet around the edge of the molding. The sheet is formed onto the molding and bonded to it in a single operation. In practice, however, the sheet often does not adequately conform to the contour of the molding, and undesirable wrinkles occur at critical and visible areas. Such wrinkles are detrimental to the product's appearance and distort its surface pattern. The adhesion between the molding and the lamination is also unsatisfactory at these points. The lower half of such a known thermoforming tool also includes many moving parts, which makes it expensive and complicated.

SUMMARY OF THE INVENTION

The principal object of the present invention is to provide an improved thermoforming tool of the type described above that will not have the aforesaid drawbacks and that produces a smooth and attractive lamination of even moldings that have elevated or depressed edges.

This object, as well as other objects which will become apparent in the discussion that follows, is achieved, in accordance with the present invention, by providing a thermoforming tool with a lower half that features a sealing lip at the level of a conceptual plane below the edge of the molding. The lip parallels the edge of the molding and demarcates the depression. The sheet can be applied against and stretched over the lip by a plunger that descends between the lip and the sheet-stretching frame into a lowermost position. The face of the plunger parallels the top of the edge of the molding. Once it is in its lowermost position, the plunger is subject to a return stroke to a position approximately at the level of the conceptual plane of the edge of the molding. The sheet, stretched to a prescribed extent, is accordingly displaced in relation to the lower half of the tool to create the wrapped-around area, rolled over against the surfaces of the molding to be laminated, and pressed down. The stresses and strains that occur in the sheet in the vicinity of the wraparound are accordingly equalized, allowing the thermally plasticized sheet to be heated to optimal forming temperature without being damaged by excessive tension at critical points. In addition to unwrinkled forming of the sheet to the molding at all points of the wraparound, unpleasant distortions of any patterns in the sheet will also be eliminated. Such patterns include for example leather graining and imprinting. Even edges that slope backward or swing in and out can be satisfactorily laminated in accordance with the present invention.

A sealing lip in the sense of the present invention is a wedge-shaped elevation entirely paralleling the edge of the molding and tightly engaging the gas-impermeable sheet as the plunger descends. The lip is not very thick and can even taper in to a narrow edge to facilitate displacing it in relation to the sheet it engages even subject to vacuum. The sheet will accordingly be continuously and progressively formed against the edge and surface of the molding in accordance with the present invention and pressed against and bonded to it without wrinkling even when there are downward projections on the back of the molding. To facilitate displacement of the sheet, the sealing lip should be as round as possible and curve into the surfaces adjacent to it at each side. A lip coated with a low-friction material or consisting partly of PTFE or silicone or entirely of such a low-friction material as PTFE or polyurethane for example has also been proven practical. Coating the lip with a material based on soap or oil is also possible and can further help to prevent tension peaks in specific areas of the sheet during forming.

Satisfactory displacement of the sheet in relation to the sealing lip and to the face of the plunger while the plunger is descending and ascending will introduce the remainder of the sheet uniformly into the depression in the lower half of the tool subject to differential atmospheric pressure and smooth it out against the bottom of the molding while preventing relative displacement at the edge. This constitutes a significant advantage with respect to eliminating wrinkling and to ensuring satisfactory adhesion in the critical areas. Equally effective adhesion can be attained with less adhesive than at the state of the art.

It is practical to coat the areas of the molding that are to be laminated with a thermally plasticizing adhesive, a hot-bonding adhesive. This adhesive is briefly applied hot while the sheet is being applied and pressed down in order to attach the sheet. The sheet must, however, be applied to the molding without wrinkling or slipping, easy in accordance with the present invention. Once the adhesive has cooled, the bond will be particularly permanent even when warmed by the rays of the sun entering a vehicle.

The mold should if possible be of a material that conducts heat poorly to ensure that the polymeric sheet will be inherently hot enough to melt the adhesive applied to the mold. The adhesive must be liquid enough to completely wet the mold while the sheet is being pressed against it. To rapidly stabilize the bond mechanically subsequent to lamination, it has been proven practical to blow air over the mold or to otherwise accelerate cooling. Since most of the sheets employed for this purpose are very thin, enough heat can escape through the sheet itself to ensure rapid and stable adhesion. Such accelerated heat dissipation will also help to secure the sheet, and the pressure of application can be removed sooner with no risk of detachment due to the resilience of the sheet.

The return stroke subsequent to stretching the sheet provides a prescribed reserve of material below the edge of the molding in accordance with the present invention. This reserve allows the sheet to be drawn with slight differential forces against the edge of and into the depression below the molding, forming the sheet against the exposed bottom margin of the mold, and bonding it thereto. The forces exploited in conventional suction presses and derived from the atmospheric differential pressure are entirely adequate for this operation.

To carry out this operation it is necessary to apply the sheet tight to the sealing lip below the edge of the molding, and this is accomplished in accordance with the present invention by means of the plunger. The lower half of the tool is mostly metal. It has been demonstrated practical to increase the temperature to improve the plasticity of the sheet.

The sealing lip can be constituted by one side of a groove that engages the lower half of the tool. The groove can be annular and continuous and accommodate all the edges of the molding.

The area of the plunger, its face, that engages the sheet should also be rounded to facilitate displacement of the sheet in relation to the face during the deformation and return stroke. This feature will distribute the expansion of the sheet over a considerable area and prevent damage to parts of the sheet while it is being laminated. It has been proven practical in this event for the face to be low-friction or provided with means of decreasing friction.

For similar reasons it has also been proven practical for the sealing lip to merge without any sudden transitions into the depression in the lower half of the tool. Such a lower half is usually constricted at the top in the vicinity of the depression and laterally overlapped like the cap of a mushroom by the molding as it rests more or less loosely thereon. This situation leaves a narrow area along the bottom margin at the edge of the molding accessible from below to the wrapped area of lamination.

The sheet-stretching frame itself is generally in two parts, one resting on top of the other with the sheet tensioned between them. Once the sheet-stretching frame has been lowered against the lower half of the tool, the margin of the sheet will accordingly be at the level of a holding position that can be above or below the sealing lip. The plunger is then lowered into its lowermost position along with the sheet, which is accordingly brought into contact with the lip and uniformly stretched. To ensure that the sheet is stretched over the frame as well as uniformly as possible, it has been proven practical for the lower half of the tool either to be cut out toward the frame or to slope up without any sudden transition. It is of advantage for the contour to be convex and round in this direction as well.

The sealing lip can be constituted by part of the wall of a groove that engages the lower half of the tool, ensuring a particularly reliable seal between the sheet and the lower half of the tool. To prevent suction from forcing the sheet against the base of the groove and keeping it out of the depression in such events, it has been proven practical for the base of the groove to be provided with at least one air-admission opening in the form of a bore or duct.

The return stroke should be synchronized with how rapidly the sheet can be drawn into the depression once the plunger is in its lowermost position. This rate is dictated by the deformability of the sheet subject to the level of vacuum applied and by the sheet's own properties. From this aspect it has been proven practical for the return stroke to be controlled.

The plunger can be accommodated and operated in various ways.

The plunger in one embodiment can be accommodated loose in the sheet-stretching frame and the return stroke initiated by a stroke independent of the frame. Unintended relative displacements of the molding as it rests loose on the lower half of the tool can accordingly be prevented very effectively.

The plunger in another embodiment can be separate from the sheet-stretching frame and accordingly movable. This approach is especially effective when moldings that differ in shape are to be wrap-laminated with different types of sheet.

The plunger can alternatively be part of the sheet-stretching frame, the return stroke being initiated when both the frame and plunger are raised.

In its simplest embodiment, the thermoforming tool can wrap-laminate a molding only from one edge. It is, however, obviously easily possible to modify the design to allow wrap-lamination from all edges. All that is necessary is for the sealing lip to surround the molding at a more or less equal distance A all around it.

One particular advantage of a thermoforming tool in accordance with the present invention is its low cost, which derives from its few moving parts. Such a tool is simple to precision-cast for example along with the plunger and can accordingly be easily adapted to a wide range of applications. Models can easily be interchanged.

The thermoforming tool in accordance with the present invention can wrap-laminate moldings with a discontinuous wrap and along all edges. Auxiliary devices to prevent wrinkling are no longer necessary. Once such processing parameters as heat level and plunger lowering-and return rates have been optimized by one of skill in the art in accordance with the particular lamination desired, operation will be very dependable, a particular advantage for industrial-scale operations.

The present invention will now be described in detail with reference to the accompanying drawings.

DESCRIPTION OF THE PREFERRED EMBODIMENTS

Similar parts are labeled with the same reference numbers in

Figure 3:
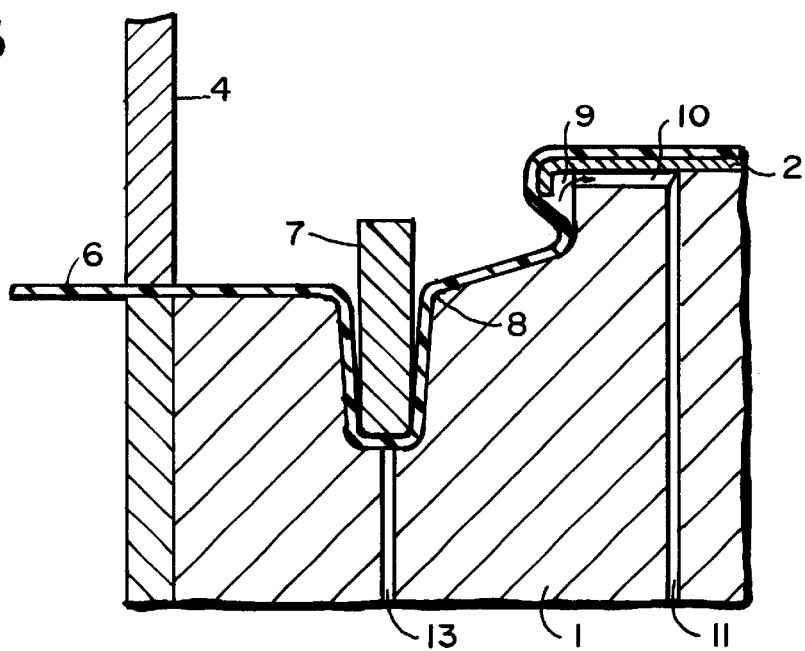
FIG. 3 is a cross-sectional view of the tool of FIG. 1, illustrating how vacuum is applied to an undercut in the tool.
Figure 4:
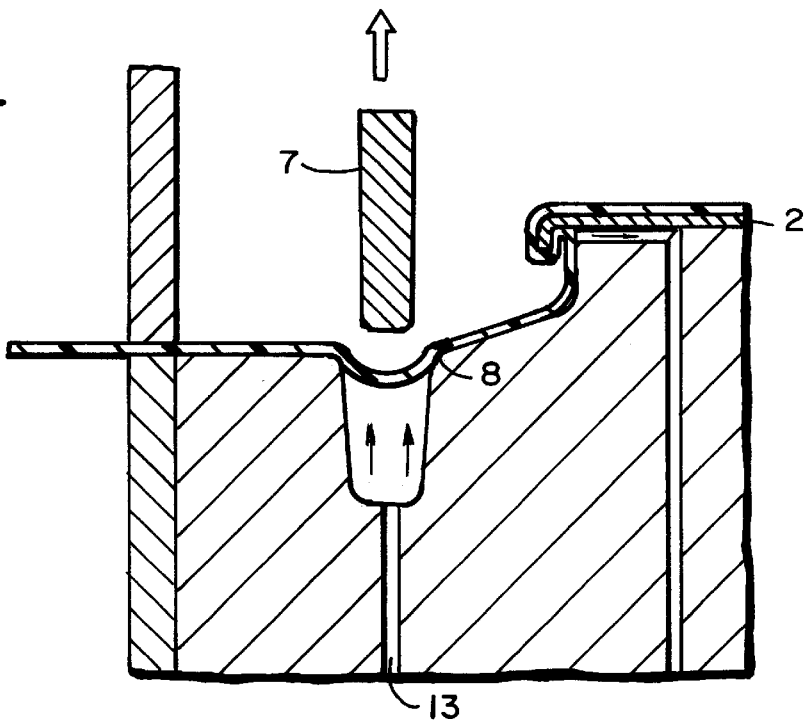
FIG. 4 is a cross-sectional view of the tool of FIG. 1, illustrating the wrapping process initiated by the suction and by the return stroke of the plunger.
Figure 5:
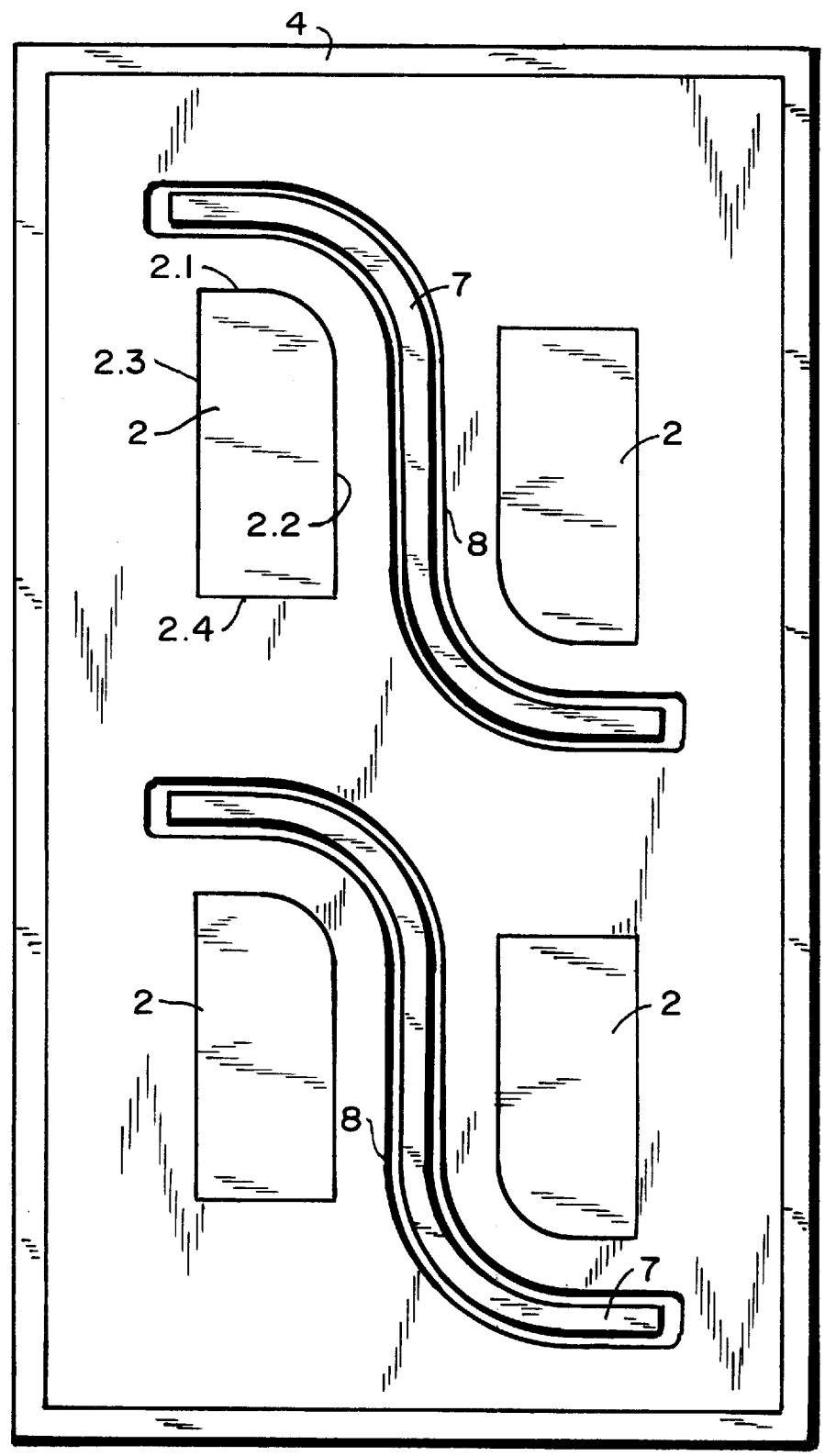
FIG. 5 is a top view of a thermoforming tool according to the invention with only some edges of four moldings surrounded by parallel lips.
Figure 6:
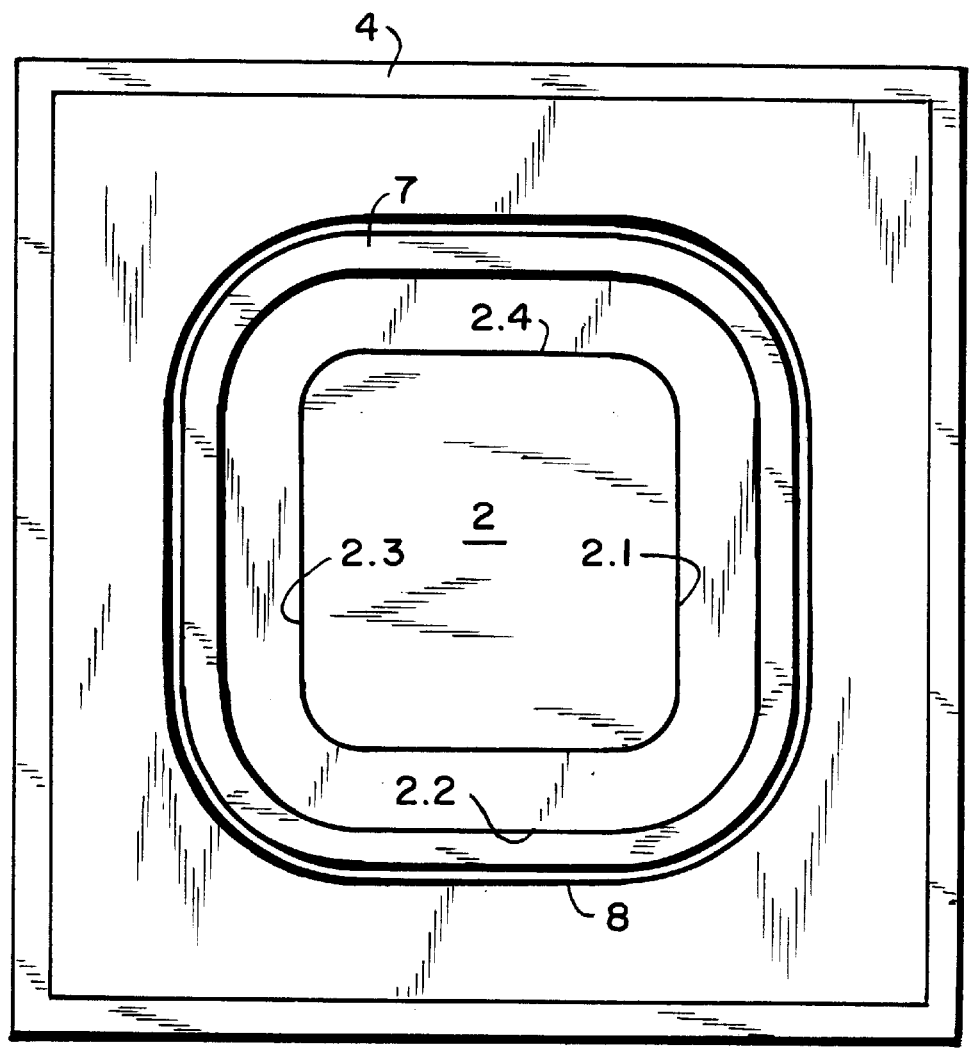
FIG. 6 is a top view of a thermoforming tool according to the invention accommodating only a single molding surrounded along all its edges by a continuous lip.

FIGS. 1 through 6. FIGS. 1 through 4 are sections through half of one embodiment of a thermoforming tool, by way of example, and FIGS. 5 and 6 illustrate different versions of a tool.

Figure 1:
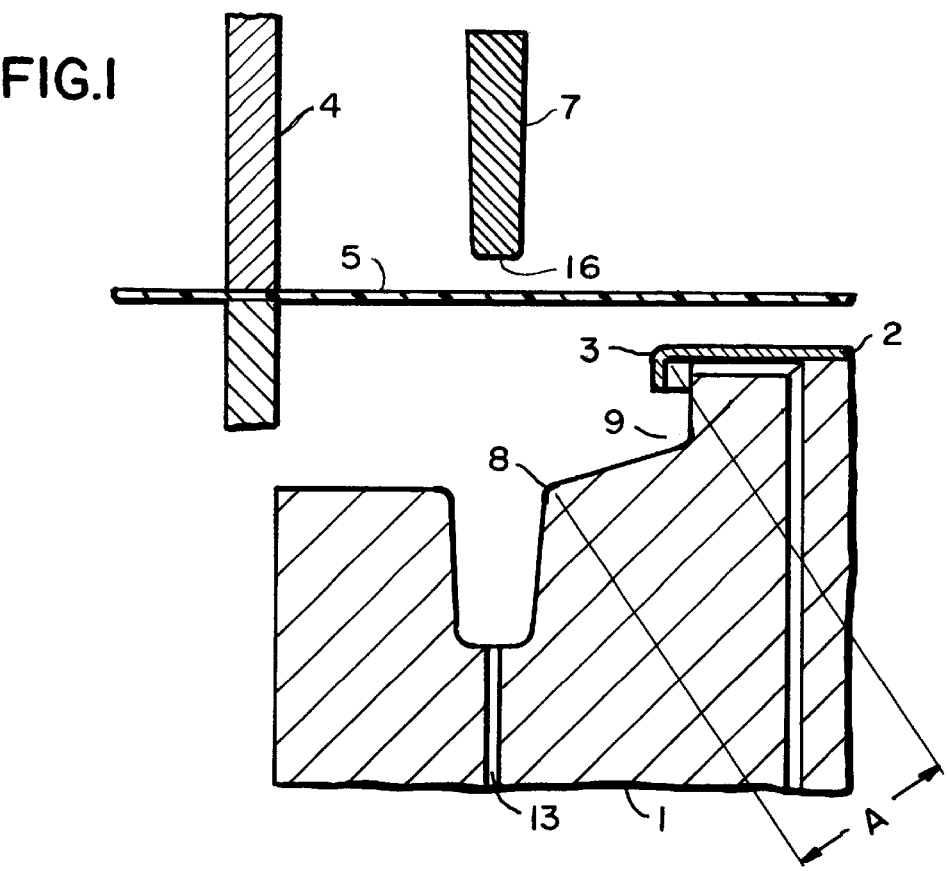
FIG. 1 is a cross-sectional view of the thermoforming tool according to the invention with the sheet-stretching frame above the lower half of the tool and the molding being laminated resting on it.

FIG. 1 illustrates a thermoforming tool with a sheet-stretching frame 4 above its lower half 1. A molding 2 that is to be laminated rests on the tool half 1. The edge 3 of molding 2, the area to be wrap-laminated, curves down. Frame 4 is in two parts, one resting on the other and both framing and securing a thermally plasticized sheet 5. Sheet 5, which can for example be leather-grained with polyethylene, has a higher plasticizing point than the areas of molding 2 that are to be laminated. At processing temperature, sheet 5 will be in a plastically deformable state, although retaining a certain level of dimensional stability. It can if necessary be additionally supported by a cushion of air or by air jets for example while being transferred into the position in frame 4 illustrated in FIG. 1. A groove 17 is within the depression 9.

Figure 2:
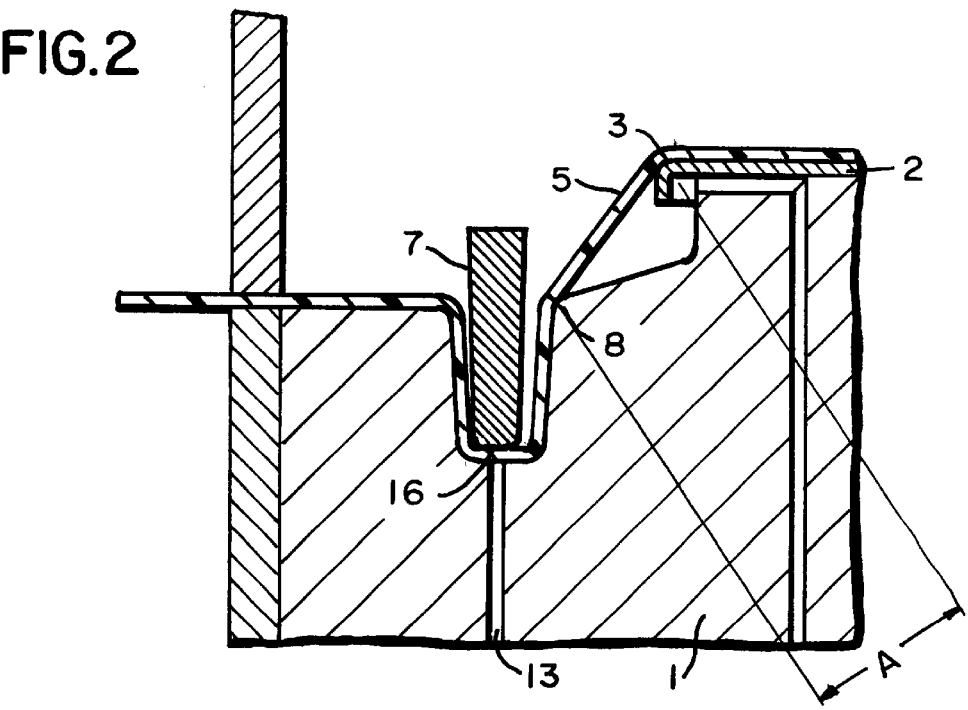
FIG. 2 is a cross-sectional view of the tool of FIG. 1 with the sheet-stretching frame lowered onto the lower half of the tool.

FIG. 2 illustrates an operating stage wherein frame 4 has been lowered against the lower half 1 of the tool with the margin of sheet 5 more or less on the same level as a sealing lip 8. Slightly higher and slightly lower positions are also possible. Once it has arrived at this level, the center of the sheet will be in contact with the surface of molding 2, forcing it against the surface of the lower half 1 of the tool. Frame 4 itself will be sealed off from half 1 by an unillustrated seal, which can be eliminated when a plunger 7 entirely surrounds molding 2 and when sheet 5 rests tight against sealing lip 8. Plunger 7 is represented in its lowermost position, preliminarily stretching sheet 5. The plunger is in the form of a wedge, narrower at the bottom, and its face 16, which comes into contact with the sheet, is rounded to ensure the sheet's satisfactory relative displacement and to distribute the tension on it as uniformly as possible. Sealing lip 8 constitutes the upper edge of a groove 17 that is entered for this purpose by plunger 7. The cross-section of the groove 17 is also a wedge, narrower at the bottom, but essentially wider than plunger 7 to prevent squeezing sheet 5. Actually, to prevent damage, sheet 5 will be in further contact only in the vicinity of sealing lip 8 and face 16. The base of the groove 17 is provided with an opening 13 that admits air to prevent suction against sheet 5. Face 16 parallels the top of the edge 3 of molding 2.

FIG. 3 illustrates the operating stage of the tool with sheet 5 still forced against sealing lip 8 by plunger 7, which has been lowered between molding 2 and frame 4. The sheet parallels the top of edge 3 a distance A with a rounded contour, and extends into the groove 17 in the lower half 1 of the tool. The groove 17 is rounded off toward both sealing lip 8 and the adjacent section of a depression 9 and toward sheet-stretching frame 4. The base of the groove 17 is provided with air-admission opening 13 to promote the release of sheet 5 as plunger 7 commences its return stroke when the sheet rests directly against the base. Plunger 7 is also rounded off in the vicinity of face 16.

The walls of the groove 17 slope up away from each other and merge gradually into the adjacent surfaces. The angle between the walls is approximately 10°, whereas the sides of the definitely narrower plunger 7 are at an angle of approximately 3° to each other. As plunger 7 descends into its lowermost position accordingly, there will be no contact between sheet 5 and the walls of the groove 17 to unnecessarily impede the relative motion, and the tension on sheet 5 will be uniformly distributed. The wall of the groove 17 can also be undercut to prevent even more effectively any contact between sealing lip 8 and the base of the groove 17. The opposite wall of the groove 17 can also be similarly undercut to further distribute the tension. The wall of the groove 17 more remote from sealing lip 8 can even be entirely left out, considerably simplifying manufacture.

Subsequent application of vacuum from lines 10 and 11 to the section of depression 9 spanned by sheet 5 will, in conjunction with the pressure of the atmosphere, form and press the sheet against the bottom of molding 2 in the vicinity of depression 9, beginning at edge 3 and continuing in a rolling motion. The hot-bonding adhesive on the molding will, where it comes into contact with the heated sheet 5, be temporarily heated, ensuring thorough wetting and adhesion of the sheet.

FIG. 4 illustrates the operating stage of the tool once plunger 7 has been returned to a position approximately on the same level as the edge 3 of molding 2. Depression 9 is still being evacuated through lines 10 and 11. Sheet 5 will accordingly be increasingly displaced over the originally contacted section of sealing lip 8 and toward depression 9, assisted by air flowing into the depression through opening 13. The already initiated bonding of sheet 5 to molding 2 will accordingly continue.

The situation prevailing during the lamination of molding 2 is particularly propitious in that the sheet 5 will be continuously applied to the surface of molding 2 in a rolling motion and pressed against it perpendicularly without being displaced, whereas the adhesive on the surface of the molding will be continuously and progressively softened by the sheet's inherent heat, solidifying as it cools. The results will be unwrinkled attachment of the sheet as it cools and outstanding adhesion on the part of the adhesive. The solidification of the adhesive can be essentially accelerated by blowing air onto the surface etc.

Frame 4 can subsequently be lifted off the lower half 1 of the tool along with the deformed sheet 5 and the laminated molding 2 and removed from the tool. The excess sheet 5 is then trimmed from the bottom of molding 2.

When the moldings to be laminated are small enough, several can be wrap-laminated along one or more edges at the same time. The tool will in this event be designed as hereintofore specified but with its sealing lips 8 and faces 16 paralleling the edges 3 of the moldings at essentially the same distance. Plunger 7 can even be in the form of a ring surrounding the various moldings 2. Such an embodiment is to be considered as within the scope of the present invention.

FIG. 5 is a top view of a thermoforming tool designed to wrap-laminate only some of the edges 3 of four moldings 2 and employing plungers 7 and sealing lips 8. This embodiment is particularly appropriate for wrap-laminating only the rounded edges 2.1 and 2.2 of moldings 2, leaving their angled edges 2.3 and 2.4 unlaminated. Plungers 7 and depressions 9 parallel the tops of rounded edges 2.1 and 2.2.

FIG. 6 is a top view of a thermoforming tool that handles only one molding 2 and has a single annular plunger 7 and a single annular sealing lip 8 surrounding all the molding's edges 2.1 through 2.4. This embodiment is particularly appropriate for wrap-laminating moldings 2 all around its edges. Similar but multiple tools of the type illustrated in FIG. 5 are also possible within the scope of the present invention.

There has thus been shown and described a novel thermoforming tool which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a thermoforming tool employed for wrap-around lamination of a sheet to at least one edge of a molding resting unattached on the tool's lower half, whereby the tool comprises a sheet-stretching frame that is positioned over the molding and lowers a thermally plasticized sheet tensioned therein at its edges into a holding position below the edge of the molding and means for providing suction employed in the subsequent lamination process, the suction means comprising an evacuatable depression in the lower half of the tool and below the edge of the molding, wherein the lower half of the tool has a sealing lip at the level of a conceptual plane below the edge of the molding, the sealing lip extending parallel to the edge of the molding and demarcating the depression, and wherein the sheet is applied against and stretched over the sealing lip, the improvement wherein the stretching is accomplished by a plunger that descends between the sealing lip and the sheet-stretching frame into a lowermost position, the bottom face of the plunger extending parallel to the top of the edge of the molding, and wherein, once the plunger is in its lowermost position, the plunger is returned to a position approximately at the level of the conceptual plane of the edge of the molding.

2. The thermoforming tool as recited in claim 1, wherein the sealing lip is rounded off where it merges into the depression.

3. The thermoforming tool as recited in claim 1, wherein the sealing lip is formed by one side of a groove that engages the lower half of the tool.

4. The thermoforming tool as recited in claim 1, wherein the groove is annular and continuous and accommodates all the edges of the molding.

5. The thermoforming tool as recited in claim 1, wherein the sealing lip is provided with an anti-adhesion coat.

6. The thermoforming tool as recited in claim 1, wherein the plunger is wedge-shaped and narrower at the bottom.

7. The thermoforming tool as recited in claim 1, wherein the bottom face of the plunger is rounded.

8. The thermoforming tool as recited in claim 6, wherein the face of She plunger has been rendered low-friction.

9. The thermoforming tool as recited in claim 3, wherein the base of the groove is penetrated by at least one air-admission opening.

10. The thermoforming tool as recited in claim 1, wherein the speed of the return stroke is variable.

11. The thermoforming tool as recited in claim 1, wherein the plunger is accommodated loose in the sheet-stretching frame and in that the return stroke is initiated by a stroke independent of the frame.

12. The thermoforming tool as recited in claim 1, wherein the plunger is separate from the sheet-stretching frame and movable.

13. The thermoforming tool as recited in claim 1, wherein the plunger is part of the sheet-stretching frame, the return stroke being initiated when both the frame and plunger are raised.

* * * * *